L. BAUER.
Improvement in Milk-Coolers.
No. 131,325.  Patented Sep. 17, 1872.
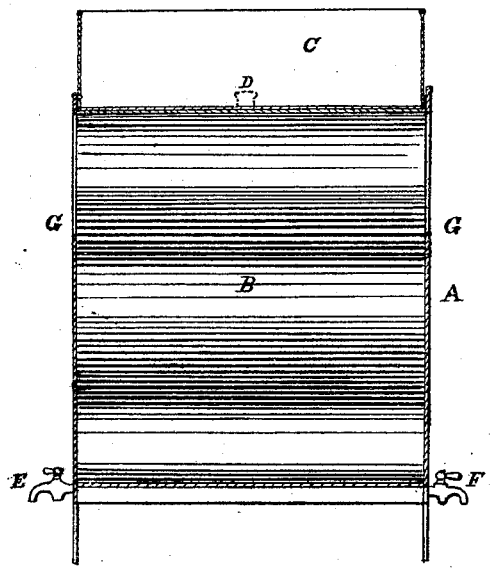
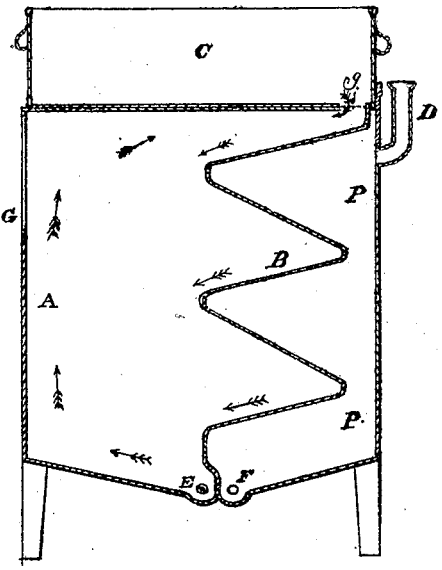
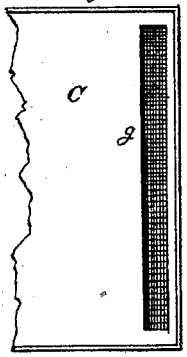
Witnesses.
W. M. Mew
S. Chapin
Inventor.
Lewis Bauer
By Swittand & Co.

UNITED STATES PATENT OFFICE.

LOUIS BAUER, OF McHENRY COUNTY, ILLINOIS.

IMPROVEMENT IN MILK-COOLERS.

Specification forming part of Letters Patent No. 131,325, dated September 17, 1872.

*To all whom it may concern:*

Be it known that I, LOUIS BAUER, in the county of McHenry, in the State of Illinois, have invented a new and useful Improved Milk-Cooler; and I do hereby declare that the following is a full and exact description thereof, reference being had to the annexed drawing forming part of the same.

Figure 1 is a front sectional view, in which C represents a compartment for the reception of milk, that part of the bottom of which, communicating with a lower chamber, A, (see Fig. 2,) being perforated to serve the purposes of a strainer. B is a series of anticlinal or zigzag shelves, upon which the milk impinges, (and is cooled thereby,) and constituting a partition by which chamber A is separated from chamber P P, (Fig. 2.) E and F are outlets for the milk and water, respectively. Fig. 2 is a transverse vertical sectional view, in which C represents the compartment for the reception of the milk. (See Fig. 1.) D is the receiving-tube for water, which flows into chamber P P. $g$ is an opening for the induction of the milk from C into A. A is the chamber in which the milk is cooled, separated by the anticlinal or zigzag shelves B from the water-chamber P P; and E and F are the outlets for the milk and water, respectively. Fig. 3 is a detached portion of the perforated receiver C. (See Figs. 1 and 2.) $g$ is the longitudinal inlet for the strained milk.

The operation is as follows: The milk being introduced by the receiver C is strained and enters the chamber A by the longitudinal inlet $g$, Fig. 2, when it immediately comes in contact with the shelves B, and is thus cooled by the water in chamber P P, (Fig. 2,) when, in obedience to well-known physical laws, the cooler portions descend to the bottom of the vessel, as indicated by the arrows in the drawing. The warmer portions rise to the surface, (as also indicated by the arrows in the drawing,) and thus a continual circulation is produced and the different portions of the milk are brought successively to the temperature of the water in the chamber P P. The milk can be retained in the chamber A or drawn off, at pleasure, that portion drawn off being the bottom and cooler portion.

What I claim, and desire to secure by Letters Patent, is—

The arrangement of the chambers A and P P, constructed substantially as and for the purposes set forth.

LOUIS BAUER.

In presence of—
 CHARLES HUNT,
 JAMES BARROWS.